April 30, 1935.  A. MADLÉ  1,999,543

POWER TRANSMISSION MECHANISM

Filed Sept. 26, 1932  3 Sheets-Sheet 2

INVENTOR
Alain Madlé
BY
ATTORNEY

April 30, 1935.　　　A. MADLÉ　　　1,999,543

POWER TRANSMISSION MECHANISM

Filed Sept. 26, 1932　　　3 Sheets-Sheet 3

INVENTOR
Alain Madlé
BY
ATTORNEY

Patented Apr. 30, 1935

1,999,543

UNITED STATES PATENT OFFICE 1,999,543

POWER TRANSMISSION MECHANISM

Alain Madlé, New York, N. Y., assignor to Erban Operating Corporation, New York, N. Y., a corporation of New York Application September 26, 1932, Serial No. 634,893

32 Claims. (Cl. 74—281)

This invention relates generally to power transmission, and in one aspect to power transmission of the planetary type, and in another aspect to power transmission employing a continuous, adhesive, operative connection between the driving and the driven members.

One of the features of my invention resides in the attainment of a speed reduction by a planetary transmission.

Another feature of my invention resides in the provision in an adhesive transmission, for shocks or impacts and more particularly of an arrangement whereby the gradients of shocks or impacts are modified, and as an additional feature thereto the association with such arrangement of means whereby the shocks or impacts so modified are compensated for.

I have illustrated in the drawings, and will describe in the specification, an embodiment in which the transmission system is of the planetary type and in which there is employed a continuous, adhesive, operative connection between the driving and the driven members, and the conjoint employment therein of the different features of my invention, although, it will be understood, that as to the employment of any one or more of my features, and even as to the conjoint employment of all of them, variations of the illustrated embodiment may be devised for this purpose, and that, therefore, the disclosure of a specific embodiment is merely illustrative and that the invention is not to be restricted, except as called for by the language of the claims.

A power transmission by adhesive contact must employ some arrangement for applying at the points of contact a pressure correctly proportioned to the load. In arrangements to which this invention has reference, such pressure is in the form of an axial component developed from the torque by a converting device, to be hereafter referred to as "a torque-loading device", and through which the axial component is delivered and applied to the adhesive system.

Where such torque-loading device is constructed and related so as to be immediately responsive to a change in the torque and to develop at the points of adhesive contact, the correct pressures without any substantial time lag, as where the torque-loading device is positioned intermediate of a source of such torque changes and such points of adhesive contact, such an arrangement will be effective, for the purposes above set forth, only where the changes or shocks are transmitted to the adhesive system through the torque-loading device, and will not be effective for shocks or torque changes originating elsewhere and not so transmitted, because such changes, being delivered directly to the points of adhesive contact, will break the adhesive contact of the system and will not be transmitted to the torque-loading device for compensation therefor by it, in the absence of special provision, and the adhesive contact will remain broken until restored by the torque-loading device.

Where I have attempted to provide against the breaking of the adhesive contact by shocks originating elsewhere, by an arrangement which will apply such a constant pressure to the points of adhesive contact of the system as will compensate for the shocks, such provision will generally fall short of the desired aim where the shocks are sufficiently sudden, or in other words, where the gradient of the shock or impact is sufficiently great, because the driving connection will be broken and remain broken between the time that the shock is first delivered to the points of adhesive contact and the compensation therefor by the torque-loading device. This elapsed time (hereinafter referred to as the time lag) is that required for the transmission of the shock from the points of adhesive contact to the torque-loading device and then back to the points of adhesive contact.

It is an object of my invention to provide, in combination with a power transmission by adhesive contact, an arrangement whereby torque changes or shocks transmitted to the adhesive system without the intervention of a torque-loading device, are so modified before reaching the points of adhesive contact that the gradient of the torque change, or impact will be reduced so as not to exceed a predetermined maximum, so that thereby the gradient of the torque change can be brought within a definite range and therefore definitely calculated and it is a further object of my invention to make provision therefor in designing the transmission and its associated parts. This provision can be arranged in any preferred or desired manner for applying to the points of adhesive contact, a constant pressure calculated from and determined by said maximum gradient so determined, so as to compensate therefor.

In accordance with the arrangement herein disclosed, I accomplish the first of these objects by interposing in the line of transmission of impacts or shocks from a source to the system of races and rolling bodies, a means which will act directly upon the torque and before it is transmitted to the adhesive system so as to modify its gradient and the degree to which this gradient is modified is determined by the design of the aforementioned means and the manner of its association with and the character of the entire installation, and the advantages of this arrangement reside in the ability to bring shocks of indeterminate gradient within determinate limits, and for which limits proper provision can be made in a manner hereinafter referred to.

In the specific embodiment herein disclosed, this torque-modifying means comprises resilient elements acting torsionally for purposes of flattening out the gradient of all shocks or impacts delivered to it, so that the impact when delivered to the adhesive system will have its gradient flattened out to within the predetermined maximum above mentioned, and in the drawings, I have illustrated this torsional means as in the form of flat springs and as acting upon the torque by being impacted by a transmission part and thus to receiving the shock and modifying it as predetermined by the design of all the associated parts of the installation.

For accomplishing a further object of this feature of my invention, namely, taking care of the shocks with their gradients reduced to below the predetermined maximum and as modified by said modifying means, I show an arrangement for supplementing the axial component developed by the torque-loading means by a means which apply to the points of adhesive contact, a constant pressure as determined by said predetermined maximum, and in the illustrated embodiment this is shown as in the form of a spiral spring arrangement which applies a constant axial pressure to the system of races and rolling bodies.

In the illustrated embodiment, I have shown my arrangement for modifying such shocks or impacts, as interposed in a line of transmission in which there is no torque-loading device and the provision of additional means for compensating for the modified impacts or torques. It will be understood, however, that such modified shocks or impacts can be compensated for by the torque-loading device associated with the system by so designing said torque-loading device that it will develop an axial component which is in excess of that required.

Another object of my invention is the provision internal to a planetary system, of means for modifying the gradient of the shocks and impacts delivered to said system, and in the particular embodiments herein disclosed, I show such modifying means as associated with the fixed member of the planetary transmission system, and in the instant case, the cage.

In the illustrated embodiment where I have shown, two sources from which torque changes could be transmitted to the adhesive system, I show the employment of a torque-loading device serving this purpose for torque changes originating at one source and my new arrangement for levelling torque changes originating at the other source. In transmissions where additional lines of torque change transmission to the system are present, of course, similar provision could be made for the additional lines of transmission.

It is another object of my invention to provide by means of a planetary system, a speed reduction between the driving and the driven ends of the system, and this is herein shown as attained by the employment of wholly independent planetary transmissions, a race of one being caused to be rotated by a race of the other and at the same rate, and the ratio between the driving and the driven members being determined by the dimensional relationship of the elements of the two systems. For illustrating one example whereby the reduction can be given a range of variability, one of the planetary systems is disclosed as of a type in which there is a continuous adhesive operative connection between the driving and the driven races and the rolling bodies are in the form of tiltable rollers controlled to change the leverage between the members of the system so as to give a continuous range of variation to the reduction between the two members.

For the attainment of these objects and such other objects as may hereinafter appear or be pointed out, I have illustrated an embodiment of my invention in the drawings, wherein:

Figure 1ª is a section on the line 1ª—1ª of Figure 1;

Figures 1, 1A:
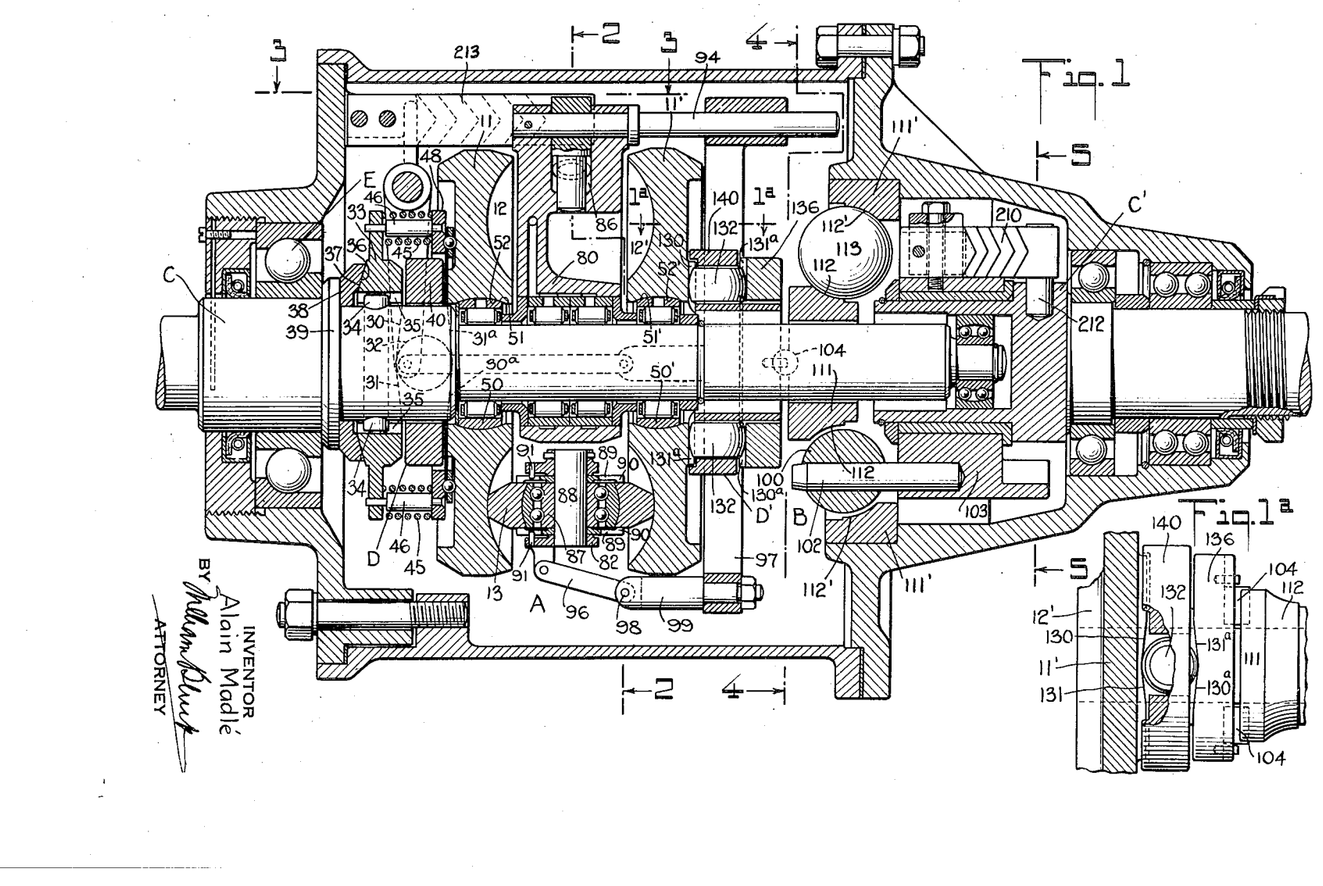
Figure 1 is a longitudinal section through the main axis of the transmission.

Upon viewing Figure 1, it will be observed that the transmission there illustrated comprises a driven and a driving member and the following means for driving one from the other (a) a compound reduction planetary system comprising two planetary systems A and B arranged in series: (b) means in connection with one of the systems and shown as the torque-loading member D for developing from the input torque, a proper axial component therefor; (c) means interposed between the two systems and shown as a torque-loading member D' for developing from the torque of the driven end of one, the proper axial component and delivering such axial component to the driving end of the second system; (d) an arrangement internal of the compound reduction planetary system for varying at will, the ratio of the reduction; (e) means (see Figure 5) for protecting the planetary transmission against the effects of impacts or shocks delivered from the driven end, and (f) means for protecting a planetary system and its components against the effect of shocks or impacts delivered thereto from no matter what source (see Figure 3).

While all of these means have been illustrated as associated together in the embodiment of Figure 1, and as conjointly employed therein, it will be understood that this has been done only for convenience of disclosure, since the features of my invention can be variously conjoined.

In Figure 1, I show at the left a rotating member C, and at the right a rotating member C', either of which may serve as the power input or driving member, in which event, the other will serve as the power output or driven member, and it will be understood, as this description is read, that it is immaterial which is the driven member, and which is the driving member, and one can be the driving member for one moment, and the other the driving member at another moment. In fact, as will appear, it is an important feature of my invention that my structure is so devised.

However, for purposes of convenience, of description herein, the rotating member C will be assumed to be the power input member, that is, the driving member, and the member C' will be assumed to be the power output member, or the driven member, although it will again be emphasized that this is only for the purpose of convenience of reference.

A system of this character, employing as it does a driving member and a driven member, and an interposed transmission for transmitting power from one to the other by means of adhesive contact, requires the employment of an arrangement for developing an axial component from the applied torque and for applying this component either directly or otherwise to the points of adhesive contact, so as to establish the drive for power transmission purposes, such arrangement being hereinafter referred to as a torque-loading device, and before proceeding to a description of the details thereof, I will premise that the compound planetary systems comprise, in fact, the planetary systems referred to generally in Figure 1, by the reference characters A and B.

Upon viewing Figure 1 of the drawings, it will here be observed, that I have illustrated the employment of such a torque-loading device at D and to the left of the transmission.

The axial component delivered by the torque-loading device D to the points of adhesive contact is developed between sets of pairs of opposed and cooperating inclined surfaces 30, 30a, 31 and 31a. As many of these sets of inclined surfaces may be employed in the torque-loading device D as it may be found necessary or desirable, although two are sufficient to serve my purposes. Between each set of such inclined surfaces, is received a rolling body 32, and it will here be stated that I have found it desirable to employ rolling bodies at all points of frictional contact in my system so as to eliminate the introduction into the functioning of the system, of a coefficient of friction which is not constant, and which, therefore, can not be calculated for.

The inclined surfaces 30, 31 are shown as formed on the inner face of a pressure member 33, and the cooperating inclined surfaces 30a and 31a are shown for purposes of this embodiment as formed on the outer surface of race ring 11 of planetary system A. The pressure member 33 is in the form of a ring so received on the shaft that while it rotates with the shaft, it will be able to move relatively thereto, but within the limits permitted by its manner of association and support.

This ring 33 is shown in the drawings as loosely keyed on the shaft, as by means of the oppositely directed projections 34, formed in the illustrated embodiment at the extreme ends of a pin transversely received through the shaft, and freely received in the opposed axial grooves 35 formed on the inner bore of the ring 33.

This ring 33 has its outer surface 36 abutting against the inner surface 37 of a collar 38 which in turn is in abutting relation to a member 39 which can be associated with the shaft in any preferred or desired manner so as to serve as a thrust abutment. The cooperating surfaces 36 and 37 are both made spherical and conform to the same radius of curvature. The loose keying of the ring 33 on the shaft and the spherical bearing surfaces 36 and 37, serve to permit the ring to have a free universal movement on the shaft for the purpose that will appear hereinafter.

As means to compensate for the impacts modified in the manner later to be described in detail, I use in addition to the required pressure applied by the torque-loading device, a constant pressure in excess of that required, and I obtain this pressure in any desired manner, as, for instance, by springs 45 in abutting relation to the members 11 and 33 and supported around the member 46, which is carried at one end from the ring 33 by means of a projecting pin, and similarly carried at the other end in a ring 48, in ball-bearing relation to the other surface of the race ring 11.

For taking up the thrust reaction of the axial component developed by the torque-loading member that is directed toward the input end, I show the angular contact ball-bearing shown at E to the left.

The rolling bodies 32 of the torque-loading device may be supported in any preferred or desired manner to serve their purpose as, for example, by the cage member 40 loosely received between the members 33 and 11 and in turn loosely carrying the rolling bodies 32.

From the description thus far given, it will be understood that where a torque or a change in the torque occurs at the end C, such torque will manifest itself in the change of the pressure developed by the torque-loading member D, and because of the characteristics of the system herein disclosed, and particularly the character of the inclined surfaces 30, 30a, 31 and 31a, and the self-aligning character of the mounting for the ring 33, that pressure will always be developed and equally distributed to the points of contact of the rolling bodies 32 of the torque-loading member and the race ring 11 which is required by the load, and it will shortly be pointed out how the pressure so developed will be directly transmitted to the points of adhesive contact always in proportion to the load.

To provide for the self-alignment of the race ring 11, so as to make the entire system, including both the torque-loading member and the race ring, self-aligning, I show in Figure 1 this race ring as bearing upon the ring 50 by means of the spherical contacting surfaces 51 and 52, so as to support this race ring also for a universal adjustment. As a result of this arrangement, the pressure developed by the torque-loading member D, equally distributed to the points of contact between the torque-loading member D, and the race ring 11 as already set forth, is delivered by that race ring to the points of adhesive contact between the race ring 11 and the rolling bodies 13, also under conditions which impel the equal distribution of the pressure upon such points of contact.

As has already been stated, the transmission to which the axial component is delivered is compound in character, and is made up of two planetary systems in series, the first, the input system being referred to generally by the reference character A and the output system being that referred to generally by the reference character B.

The input system A comprises the races 11 and 11' each provided with the toric faces 12 or 12' (hereinafter referred to as "race ways") positioned in symmetrical opposed relation, and rolling bodies received between them.

The race ring 11' is also supported upon a bearing 50' by means of the spherical surfaces 51' and 52', so that the pressure so delivered to that race ring 11' by the torque-loading member D' will be equally distributed and applied to the points of adhesive contact of that race ring with the rolling bodies 13.

The output system B comprises generally the races 111 and 111' each provided with the toric faces 112 and 112' positioned in opposed symmetrical relation and rolling bodies shown as in the form of balls 113 received between them.

Before describing the relationship of these two systems, I will premise (a) that two systems so related will give a reduction, and that the character of the reduction will be determined by the dimensional relationship of the systems or more accurately, the leverages between the elements of each system, and as a further feature of my invention, I arrange that the reduction effected as a resultant of these two systems arranged in series can be varied at will, and for this purpose, I disclose the incorporation in one of the systems of means whereby the leverage between the elements of that system can be changed at will, thus correspondingly effecting the reduction. In the specific embodiment this has been shown as incorporated in the input system A, although as will be understood, it can be embodied in either or in both systems, so as to either broaden or narrow the band or range of variability in the reduction.

Before describing the details of my arrangement for attaining this variation, I will premise that (1) the variation is attained by change of leverage between the elements of the system; (2) the change in leverage is attained by the tilting of the rollers, and (3) the tilting of the rollers is attained first by an angling of the rollers about their points of adhesive contact with the races and the action of the races upon the rollers as long as they remain angled, to give them a rolling movement to successively new positions of tilt until the desired change in tilt has been reached.

For this purpose, the rolling bodies, of the input system A for example, take the forms of rollers 13, the contacting surfaces of which are generated specifically to permit these rollers to maintain a proper adhesive contact with the toric surfaces of the races as they are tilted and are, therefore, of a transverse radius not in excess of, and preferably smaller than, the transverse curvature of the toric faces 12 and 12', and the center of the rollers are shown as in the locus or path of a circle that generates these toric surfaces.

Figure 2:
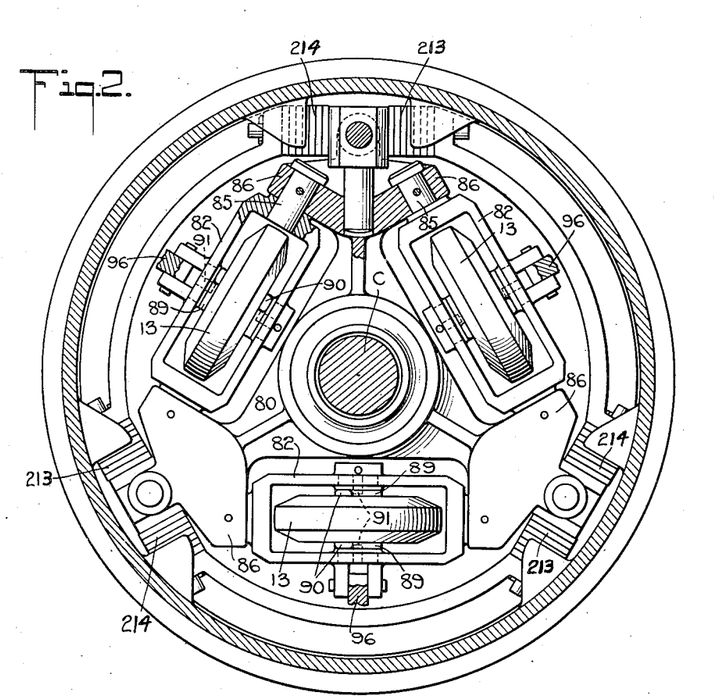
Figure 2 is a section taken on line 2—2 of Figure 1.

Upon viewing Figures 1 and 2 of the drawings, it will be observed that rollers 13 are each carried in a frame 82 mounted for pivotal movement about an axis diametrical of the roller and perpendicular to the axis through the point of contact of the roller with the races, as by means of pins 85 about which the frame 82 swivels. The pins in turn are mounted in ears 86, (see Figure 2) fixedly related to and carried by the cage 80.

Figure 6:
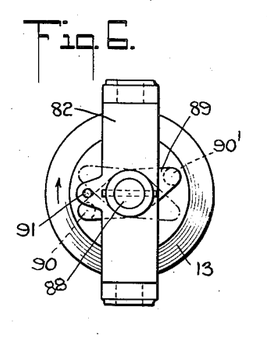
Figure 6 shows a detail of roller support and control.

To impose upon the rollers the aforementioned angling movement so as to position each roller angularly of its normal path of travel, and thus permit the rotation of the races to translate the rollers to successively new positions as the races rotate, I employ an arrangement which comprises generally a universal support for each roller and means controlled by the tilting of the frames 82 to cause each roller to angle in that direction determined by the direction of tilting of the frame, and as shown in Figures 1, 2 and 6, this universal support for each roller is attained by mounting it upon a self-aligning bearing 87 carried by the pin 88 which in turn is supported from the frame 82. In this manner, the roller 13 can assume any position relatively to the frame within the limits fixed by the design.

In Figures 2 and 6 is shown the arrangement by which an angling movement is given to the rollers by the frames 82. This arrangement comprises members 89 adjacent the rollers. These members are mounted intermediate their ends about the pins 88 of the rollers, each member being provided at its terminal ends with the inwardly directed projections 90 and 90' so arranged as to be closely adjacent to the faces of the rollers. While the members 89 are free to swing about the pins 88 this swinging movement is limited to a movement of these members from their full line position shown in Figure 6 to the dotted line position shown in this figure, and this I accomplish by the provision of pins 91 carried by the frames 82 and presented in the path of movement of the projections 90 and 90'.

The direction of movement of the frames 82 about the axis of the pins 85 will, therefore, determine which projection 90 or 90' of each member 89 is moved into contact with the roller, and the direction of the rolling movement of the roller will determine which of the two positions shown in Figure 6, the members 89 will assume.

The roller frames 82 and their attendant and associated parts are all supported from the roller carrier or cage 80 which bears about one of the rotating members C or C', as shown in Figure 1, and is held against rotation in the specific manner and for the added purposes to be hereinafter referred to, in any preferred or desired manner.

The frames 82 are moved angularly in any preferred or desired manner as by control levers or links 96 which in turn are operated simultaneously and in unison by the regulating disk 97, to which each of the links 96 is connected as by a pivot 98 and a bolt 99 which is shown as fixedly associated with the disk 97. The disk 97 in turn is supported for rectilinear movement along the axis of the transmission in any preferred or desired manner, as for example, by the bolts 94 carried by and extending from the cage 80.

The rectilinear movement may be imparted to the controlling disk 97 in any preferred or desired manner.

It will be assumed that the roller 13 is rotating in the direction shown by the arrow in Figure 6, in which event the member 89 will be in a position shown in full lines in this figure, and any angular movement given to the frame 82 will cause the projection 90 or 90' as the case may be, to be moved into contact with the roller to tilt the roller about an axis diametrically through the point of adhesive contact of the races therewith. To provide a balanced turning movement for each roller by forces applied to opposite faces of the rollers, I duplicate the members 89 to each side of each roller so as to provide two such members for each roller. Upon any angling of the frame 82, the roller will be tilted through members 89 positioned to opposite sides thereof and acting together to angle the roller in the same direction and to the same extent.

If the frame 82 is moved angularly while the roller 13 is moving in the direction opposite to that shown by the arrow in Figure 6, the movement of the projection 90 or 90' as the case may be into contact with the roller will first cause the roller to carry the contacting projection with it to thereby move the member 89 from its full line position to its dotted line position until the pin 91 stops such movement upon which the turning movement of the wheel will occur exactly as above set forth and in a direction dependent upon the direction of the angular movement of the frame 82.

Upon a continued tilting of the frame 82 by the disk 97, the members 89 will move the roller angularly to increasing extents. Due to this change in its angular position, the roller will roll diagonally across the face of the races to change its tilt. The controlling member 97 is moved, as set forth, until a tilt of the rollers is reached to give the desired speed change. When the controlling disk stops moving, however, the rollers will continue to move diagonally and in such movement will move away from that pressure-applying projection 90 or 90' of each member 89 which has been causing it to angle and will move into contact with the pressure-applying projections on the members to the other side of the pins 85, and in such movement will act in connection with the projections on that side, in the same manner as it did in connection with the initiation of the angling movement to cause a restoration of the rollers to a position in the normal path of their travel.

The race ring 11' can be considered the output end of the first planetary system.

I will now describe the arrangement shown in this figure for developing from the torque of the output race ring 11', a proper axial component and for delivering it to the second of the planetary systems. Attention is particularly invited to the torque-loading device shown generally at D' which develops the axial component from the torque of the race ring 11' and delivers such axial component to the second system in the manner which I will now describe. This torque-loading device comprises sets of inclined surfaces 130, 130a, 131 and 131a, formed on the adjacent faces of the race ring 11' and the pressure ring 136 between which are received the rolling bodies 132. These rolling bodies are mounted in the carriage 140. The pressure ring 136, however, is in self-aligning, driving association with the race ring 111 in any preferred or desired manner, as, for example, by means of two pins 104, the common axis of which is a diameter perpendicular to the common axis of the rolling bodies 132.

It has already been set forth that the race ring 11 is mounted for universal adjustment, and the members 140 and 136 are also mounted for free adjustment about the main axis of the transmission, and the race ring 111 of the second system is also freely mounted for universal adjustment both with reference to the rolling bodies 113 and also with reference to the pressure ring 136, so that, in this manner, the torque-loading device and the race ring 11 of the first system, and the race ring 111 of the second system, form a universal self-aligning series of elements which complete the self-alignment of the entire system, reference to portions of which has already been made above.

Figure 3:
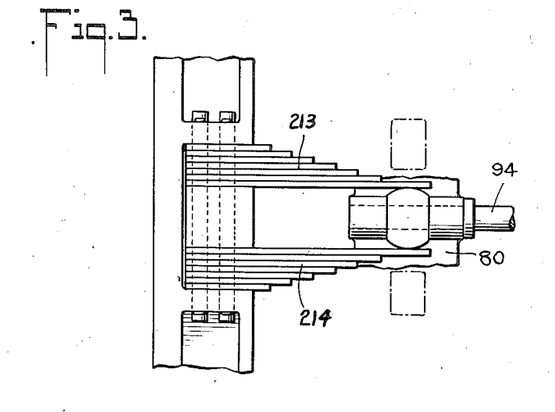
Figure 3 is a view taken on line 3—3 of Figure 1.
Figure 4:
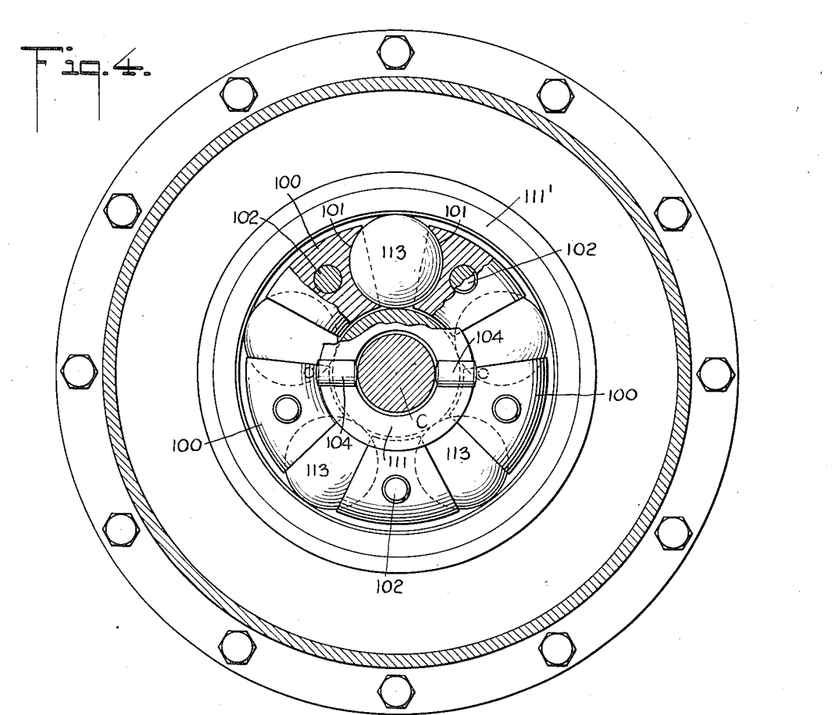
Figure 4 is a section taken on line 4—4 of Figure 1 looking in the direction of the arrows.

The output power is taken off the rolling bodies 113 of the second system, and I show in Figures 1 and 3, one arrangement, for purpose of exemplification, by which this is accomplished. This arrangement comprises spacer members 100 having spherical bearing surfaces 101 for the balls 113, and each in turn being loosely carried by a pin 102 projecting forwardly from the member 103, which in turn is supported by and is in driving connection with the driven shaft C'.

From the description thus far given, it will be understood that a torque delivered at the input end will be transmitted to the first system from the torque-loading device, which will develop the proper axial component, and is applied to the first system, and that the torque of this first planetary system A will be delivered to the second torque-loading device D', which is also developing the proper axial component, and deliver it to said second system, and that both of these torque-loading devices, will take care of all torques from the input end, and that for this purpose, the transmission is made self-aligning throughout, and that the reduction which is effected at any time will be determined by the relative leverages between the members of the two systems, and that in view of the fact that the leverage of one of the systems can be varied so can also the reduction.

I will now describe my arrangement whereby shocks or impacts from the output end of the system are so treated as to prevent any adverse effect upon the adhesive system, and this arrangement is in the form of means which does not develop an axial component.

This arrangement can be broadly described as resilient elements in the path of transmission of such shocks to the planetary systems, which serve to reduce these shocks to below a predetermined maximum and which can therefore be calculated and for which definite provision can be made. These elements are shown in detail in Figures 1 and 5 of the drawings as in the form of sets of packed leaf springs 210 and 211 carried from a spider member and positioned on opposite sides of a pin 212 carried by and projecting outwardly from the driven member C'. These springs 210 and 211 are so designed and associated as to attain my objective, namely, to reduce to below the predetermined maximum, impacts originating at the output end. I provide for these impacts so reduced by so constructing and designing the springs 45 employed as part of the torque-loading device A as to serve, not only to maintain the parts in associated relation, but also additionally to apply to the transmission systems, an axial component which is constant, and which is sufficient to compensate for this predetermined maximum below which the impacts are reduced.

When an arrangement functioning as the torsion springs 210 and 211, is employed with a roller carriage of a planetary system, it serves not only all the purposes as set forth above, but also as a spring buffer for that element against shocks from whatever direction, and additionally to loading the points of adhesive contact of that system against such shocks, and I have illustrated such a use in connection with the roller carrier 80 of the first system, wherein sets of torsion springs 213 and 214 are arranged on opposite sides.

Upon viewing Figure 2 of the drawings, it will be observed that I have illustrated as many sets of packed springs associated with the cage 80 as there are employed rolling members 13, and that these sets are arranged symmetrically with reference to the system so that I thus obtain a balanced spring support for that portion of the system involving the cage and the rolling bodies. In this manner I neutralize reaction forces on the bearings and thus eliminate any ultimate reaction on the main transmission shaft.

Figure 5:
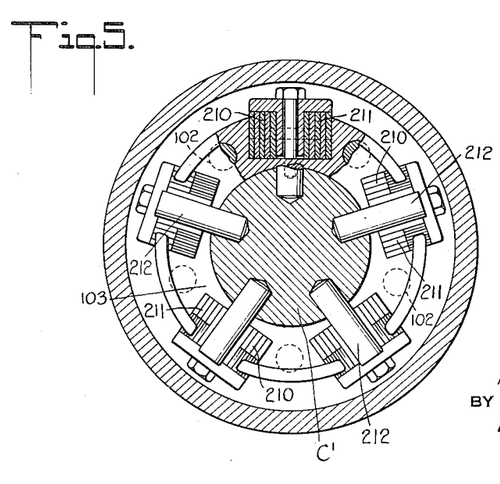
Figure 5 is a section taken on the line 5—5 of Figure 1 looking to the left.

Upon viewing Figure 5 of the drawings, it will here be observed that I associate five sets of packed springs 210, corresponding to the five balls 113, with the driven end of the system to balance the reactions throughout this end of the system for similar purposes.

Having described my invention what I claim as new, and desire to secure by Letters Patent, is:

1. In a device of the character described, a plurality of torque-transmitting members, means comprising a system of races and rolling bodies in adhesive frictional driving contact, for driving one of said members from another, means for converting the torque of one of said members into an axial component proportional to the torque and operative upon the races and rolling bodies to produce that pressure between the races and the rolling bodies which is required in order to maintain the proper frictional driving contact for the particular torque being transmitted so as to maintain the proportionality thereto, means for applying said axial component to the points of adhesive contact, and means in the path of transmission of impacts or shocks from the other of said torque-transmitting members to said system for modifying such shocks to within a controllable range, and means for modifying the effect of said controlled shocks so as to obviate their contact-disrupting effects on the system.

2. In a device of the character described, a plurality of torque-transmitting members, means comprising a system of races and rolling bodies in adhesive, frictional driving contact for driving one of said members from another, means for converting the torque of one of said members into an axial component proportional to the torque and operative upon the races and rolling bodies to produce that pressure between the races and the rolling bodies which is required in order to maintain the proper frictional driving contact for the particular torque being transmitted so as to maintain the proportionality thereto, means for applying said axial component to the points of adhesive contact, and torsion means in the path of transmission of impacts or shocks from the other of said torque-transmitting members to said system for modifying such shocks to within a controllable range, and means for modifying the effect of said controlled shocks so as to obviate their contact-disrupting effects on the system.

3. In a device of the character described, a plurality of torque-transmitting members, means comprising a system of races and rolling bodies in adhesive, frictional driving contact for driving one of said members from another, means for converting the torque of one of said members into an axial component proportional to the torque and operative upon the races and rolling bodies to produce that pressure between the races and the rolling bodies which is required in order to maintain the proper frictional driving contact for the particular torque being transmitted so as to maintain the proportionality thereto, means for applying said axial component to the points of adhesive contact, and packed springs in the path of transmission of impacts or shocks from the other of said torque-transmitting members for modifying such shocks to within a controllable range, and means for modifying the effect of said controlled shocks so as to obviate their contact-disrupting effects on the system.

4. In a device of the character described, a plurality of torque-transmitting members, means comprising a system of races and rolling bodies in driving contact for driving one of said members from another, means for converting the torque of one of said members into an axial component proportional to the torque and operative upon the races and rolling bodies to produce that pressure between the races and the rolling bodies which is required in order to maintain the proper frictional driving contact for the particular torque being transmitted so as to maintain the proportionality thereto, means for applying said axial component to the points of adhesive contact, and means in the path of transmission of impacts or shocks through said system for modifying such shocks to within a controllable range, and said torque converting means being adapted for compensating for impacts within the aforementioned controllable range.

5. In a device of the character described, a plurality of torque-transmitting members, means comprising a system of contacting races and rolling bodies for driving one of said members from another, means for converting the torque transmitted by one of said members into an axial component operative upon the races and rolling bodies to produce that pressure between the races and the rolling bodies which is required in order to maintain the proper frictional driving contact for the particular torque being transmitted so as to maintain the proportionality thereto, means for applying said axial components to the points of adhesive contact, means in the path of transmission of impacts or shocks from another torque-transmitting member through said system for modifying such shocks to within a controllable range, and means for compensating for impacts within the aforementioned controllable range, said last-mentioned means comprising an arrangement for applying that constant pressure to the points of adhesive contact as determined by such range.

6. In a device of the character described, a plurality of torque-transmitting members, means for driving one of said members from another, comprising a system of contacting races and rolling bodies, and means in the path of transmission of impacts or shocks from the driven member to said system for reducing the effect of such shocks on said system within a controllable range.

7. In a device of the character described, a plurality of torque-transmitting members, means for driving one of said members from another, comprising a system of contacting races and rolling bodies, means in the path of transmission of impacts or shocks from the driven member to said system for reducing the effect of such shocks on said system within a controllable range, and means for compensating for impacts so reduced.

8. In a device of the character described, a plurality of torque-transmitting members, means for driving one of said members from another, comprising a system of contacting races and rolling bodies, means in the path of transmission of impacts or shocks from the driven member to the system for reducing the effect of such shocks on the system within a controllable range, and means for compensating for impacts so reduced, said last-mentioned means comprising the provision of a pressure applied to the points of adhesive contact between the races and the rolling bodies sufficient for such range.

9. In a device of the character described, a plurality of torque-transmitting members, means for driving one of said members from another, comprising a system of contacting races and rolling bodies, and means in the path of transmission of impacts or shocks from the driven member to said system for reducing the contact-disrupting effects thereof on said system to below a predetermined maximum.

10. In a device of the character described, a plurality of torque-transmitting members, means for driving one of said members from another, comprising a system of contacting races and rolling bodies, means in the path of transmission of impacts or shocks from the driven member for reducing the effects thereof on said system to below a predetermined maximum, and an arrangement for providing for impacts so reduced by which the contact-disrupting effect of said impacts on said system is obviated.

11. In a device of the character described, a plurality of torque-transmitting members, means for driving one of said members from another, comprising a system of races and rolling bodies in adhesive contact, and torsion means in the path of transmission of impacts or shocks from the driven member for reducing the effects thereof to below a predetermined maximum and torsion means in the path of impacts or shocks from the driving member for reducing the effects thereof to below a predetermined maximum.

12. In a device of the character described, a plurality of torque-transmitting members, means for driving one of said members from another, comprising a system of adhesively contacting races and rolling bodies, torsion means in the path of transmission of impacts or shocks from the driven member for reducing the effects thereof on said system to below a predetermined maximum, and means for applying to the system a pressure sufficient to compensate for impacts below such predetermined maximum.

13. In a device of the character described, a plurality of torque-transmitting members, means for driving one of said members from another, comprising a system of frictionally contacting races and rolling bodies, means for converting the torque of one of said members into an axial component operative upon the races and rolling bodies to produce that pressure between the races and the rolling bodies which is required in order to maintain the proper frictional driving contact for the particular torque being transmitted so as to maintain the proportionality thereto, means for applying said axial component to the points of adhesive contact, and means in the path of transmission of impacts or shocks from the other member for reducing such shocks to within a predetermined maximum, the parts being so arranged and constructed as to apply to the system a pressure in excess of the required axial component.

14. A power transmission system for transmitting torques from one element to another, having two serially related systems of adhesively contacting races and rolling bodies intermediate said elements and serving to transmit torques therebetween, means adapted to cause one of the races of one of said systems to rotate with one of said elements, and one of said systems having one of its races held against rotation and having its rolling bodies carried by the other of said elements, and interlocking means intermediate the other races of the two systems for causing them to rotate together.

15. A power transmission system for transmitting torques from one element to another, two serially related systems of adhesively contacting races and rolling bodies intermediate said elements and serving to transmit torques therebetween, means adapted to cause one of the races of one of said systems to rotate with one of said elements and to develop an axial pressure on the parts of said systems proportional to the transmitted torques, and one of said systems having one of its races held against rotation and having its rolling bodies carried by the other of said elements, and interlocking means intermediate the other races of the two systems for causing them to rotate together.

16. A power transmission system for transmitting torques from one element to another, two serially related systems of adhesively contacting races and rolling bodies intermediate said elements and serving to transmit torques therebetween, means adapted to cause one of the races of one of said systems to rotate with one of said elements and to develop an axial pressure on the parts of said systems proportional to the transmitted torques and one of said systems having one of its races held against rotation and having its rolling bodies carried by the other of said elements, and means intermediate the other races of the two systems for causing them to rotate together, for transmitting the torques, and for generating an axial pressure on the parts of the systems proportional to the torque transmitted.

17. A power transmission system for transmitting torques from one element to another, two serially related systems of adhesively contacting races and rolling bodies intermediate said elements, and serving to transmit torques therebetween, means adapted to cause one of the races of one of said systems to rotate with one of said elements, and one of said systems having one of its races held against rotation and having its rolling bodies carried by the other of said elements, and means intermediate the other races of the two systems, for causing them to rotate together, for transmitting the torques, and for generating an axial pressure on the parts of the systems proportional to the torque transmitted.

18. A power transmission system for transmitting torques from one element to another, two serially related systems of adhesively contacting races and rolling bodies intermediate said elements and serving to transmit torques therebetween, means adapted to cause one of the races of one of said systems to rotate with one of said elements and one of said systems having one of its races held against rotation and having its rolling bodies carried by the other of said elements, and means intermediate said last-mentioned element and the rolling bodies carried by it for transmitting torques thereto and for limiting the magnitude of the transmitted torques.

19. A power transmission system for transmitting torques from one element to another, two serially related systems of adhesively contacting races and rolling bodies intermediate said elements and serving to transmit torques therebetween, means adapted to cause one of the races of one of said systems to rotate with one of said elements and one of said systems having one of its races held against rotation and having its rolling bodies carried by the other of said elements, and means associated with the rolling bodies of the other system for limiting the magnitude of the torques transmitted thereby.

20. In a power transmission system, a torque-transmitting member, a pair of races mounted thereon, so as to be freely rotatable in relation thereto, rolling bodies intermediate said races and in adhesive rolling contact therewith, and adapted to transmit motion from one race to the other, a torque-loading member intermediate one of said races and the said torque-transmitting member and adapted to interlock said race and member so as to cause them to rotate together and to generate an axial pressure acting to maintain contact between said races and rolling bodies, said pressure being proportional to the torque transmitted, a second set of rolling bodies carried by another of said torque-transmitting members, a pair of races in adhesive rolling contact with said second set of rolling bodies, one of said last-mentioned races being held against rotation, and a torque-loading member intermediate the other race of said pair of races and the second of the aforesaid races whereby the same may be locked so as to move together, and an axial pressure proportional to the torque transmitted will be generated to maintain contact between said races and rolling bodies.

21. In a power transmission system, a torque-transmitting member, a pair of races mounted thereon so as to be freely rotatable in relation thereto, and so as to be self-aligning, rolling bodies intermediate said races and in adhesive rolling contact therewith and adapted to transmit motion from one race to the other, a torque-loading member intermediate one of said races and the said torque-transmitting member and adapted to interlock said race and member so as to cause them to rotate together and to generate an axial pressure acting to maintain contact between said races and rolling bodies, said pressure being proportional to the torque transmitted, a second set of rolling bodies carried by another of said torque-transmitting members, a pair of races in adhesive rolling contact with said second set of rolling bodies, one of said last-mentioned races being held against rotation, and a torque-loading member intermediate the other race of said pair of races and the second of the aforesaid races whereby the same may be locked so as to move together, and an axial pressure proportional to the torque transmitted will be generated to maintain contact between said races and rolling bodies.

22. In a power transmission system, a torque-transmitting member, a pair of races mounted thereon so as to be freely rotatable in relation thereto, and so as to be self-aligning, rolling bodies intermediate said races and in adhesive rolling contact therewith and adapted to transmit motion from one race to the other, and means associated with said rolling bodies for limiting the magnitude of the torques transmitted thereby, a second set of rolling bodies carried by another of said torque-transmitting members, a pair of races in adhesive rolling contact with said second set of rolling bodies, one of said last-mentioned races being held against rotation, and a torque-loading member intermediate the other race of said pair of races and the second of the aforesaid races whereby the same may be locked so as to move together, and an axial pressure proportional to the torque transmitted will be generated to maintain contact between said races and rolling bodies.

23. In a power transmission system, a torque-transmitting member, a pair of races mounted thereon so as to be freely rotatable in relation thereto, and so as to be self-aligning, rolling bodies intermediate said races and in adhesive rolling contact therewith and adapted to transmit motion from one race to the other, a torque-loading member intermediate one of said races and the said torque-transmitting member and adapted to interlock said race and member so as to cause them to rotate together and to generate an axial pressure acting to maintain contact between said races and rolling bodies, said pressure being proportional to the torque transmitted, a second set of rolling bodies carried by another of said torque-transmitting members, a pair of races in adhesive rolling contact with said second set of rolling bodies, one of said last-mentioned races being held against rotation, and a torque-loading member intermediate the other race of said pair of races and the second of the aforesaid races whereby the same may be locked so as to move together, and an axial pressure proportional to the torque transmitted will be generated to maintain contact between said races and rolling bodies, and means associated with said second set of rolling bodies for limiting the magnitude of the torques transmitted thereby.

24. In a power transmission system, a torque-transmitting member, a pair of races mounted thereon so as to be freely rotatable in relation thereto, rolling bodies intermediate said races and in adhesive rolling contact therewith and adapted to transmit motion from one race to the other, a torque-loading member intermediate one of said races and the said torque-transmitting member and adapted to interlock said race and member so as to cause them to rotate together and to generate an axial pressure acting to maintain contact between said races and rolling bodies, said pressure being proportional to the torque transmitted, a second set of rolling bodies carried by another of said torque-transmitting members, a pair of races in adhesive rolling contact with said second set of rolling bodies, one of said last-mentioned races being held against rotation, and a torque-loading member intermediate the other race of said pair of races and the second of the aforesaid races whereby the same may be locked so as to move together, and an axial pressure proportional to the torque transmitted will be generated to maintain contact between said races and rolling bodies.

25. In a power transmission system, a torque-transmitting member, a pair of races mounted thereon so as to be freely rotatable in relation thereto, rolling bodies intermediate said races and in adhesive rolling contact therewith and adapted to transmit motion from one race to the other, and means associated with said rolling bodies for limiting the magnitude of the torques transmitted thereby, a second set of rolling bodies carried by another of said torque-transmitting members, a pair of races in adhesive rolling contact with said second set of rolling bodies, one of said last-mentioned races being held against rotation, and a torque-loading member intermediate the other race of said pair of races and the second of the aforesaid races whereby the same may be locked so as to move together, and an axial pressure proportional to the torque transmitted will be generated to maintain contact between said races and rolling bodies.

26. In a power transmission system, a torque-transmitting member, a pair of races mounted thereon so as to be freely rotatable in relation thereto, rolling bodies intermediate said races and in adhesive rolling contact therewith and adapted to transmit motion from one race to the other, a torque-loading member intermediate one of said races and the said torque-transmitting member and adapted to interlock said race and member so as to cause them to rotate together and to generate an axial pressure acting to maintain contact between said races and rolling bodies, said pressure being proportional to the torque transmitted, a second set of rolling bodies carried by another of said torque-transmitting members, a pair of races in adhesive rolling contact with said second set of rolling bodies, one of said last-mentioned races being held against rotation, and a torque-loading member intermediate the other race of said pair of races and the second of the aforesaid races whereby the same may be locked so as to move together, and an axial pressure proportional to the torque transmitted will be generated to maintain contact between said races and rolling bodies, and means associated with said second set of rolling bodies for limiting the magnitude of the torques transmitted thereby.

27. In a power transmission system, a torque-transmitting member, a pair of races mounted thereon so as to be freely rotatable in relation thereto, rolling bodies intermediate said races and in adhesive rolling contact therewith and adapted to transmit motion from one race to the other, a torque-loading member intermediate one of said races and the said torque-transmitting member and adapted to interlock said race and member so as to cause them to rotate together and to generate an axial pressure acting to maintain contact between said races and rolling bodies, said pressure being proportional to the torque transmitted, a second set of rolling bodies carried by another of said torque-transmitting members, a pair of races in adhesive rolling contact with said second set of rolling bodies, one of said last-mentioned races being held against rotation, and a torque-loading member intermediate the other race of said pair of races and the second of the aforesaid races whereby the same may be locked so as to move together, and an axial pressure proportional to the torque transmitted will be generated to maintain contact between said races and rolling bodies, and the axes of the rolling bodies of said first set being adjustable for the purpose of varying the ratio of transmission.

28. A variable speed power transmission adapted to transmit power from a driving to a driven element, a race adapted to rotate with one of said elements a second race rotatable about said element and rolling bodies intermediate said races, adapted to transmit power from one to the other at a variable speed ratio, a differential system comprising races and rolling bodies intermediate said second race and the driven member and having its rolling bodies carried by the other of said elements, and one of its races driven by said second race.

29. A variable speed power transmission adapted to transmit power from a driving to a driven element, a race adapted to rotate with one of said elements a second race rotatable about said element, rolling bodies intermediate said races, adapted to transmit power from one to the other at a variable speed ratio, a differential system comprising races and rolling bodies, intermediate said second race and the driven member and having its rolling bodies carried by the other of said elements and one of its races driven by said second race, and means adapted to generate a pressure proportional to the transmitted torque intermediate said two last mentioned races.

30. A power transmission system for transmitting torques from one element to another, two serially related systems of adhesively contacting races and rolling bodies intermediate said elements and serving to transmit torques therebetween, means adapted to cause one of the races of one of said systems to rotate with one of said elements and to develop an axial pressure on the parts of said systems proportional to the transmitted torques and one of said systems having its rolling bodies carried by the other of said elements, and means intermediate the other races of the two systems for causing them to rotate together, for transmitting the torques, and for generating an axial pressure on the parts of the systems proportional to the torque transmitted.

31. A power transmission system for transmitting torques from one element to another having two serially related systems of adhesively contacting races and rolling bodies intermediate said elements and serving to transmit torques therebetween, means adapted to cause one of the races of one of said systems to rotate with one of said elements, and one of said systems having one of its races held against rotation and having its rolling bodies carried by the other of said elements, and interlocking means independent of said first mentioned means intermediate the other races of the two systems for causing them to rotate together.

32. A power transmission system for transmitting torques from one element to another, two serially related systems of adhesively contacting races and rolling bodies intermediate said elements and serving to transmit torques therebetween, means adapted to cause one of the races of one of said systems to rotate with one of said elements and to develop an axial pressure on the parts of said systems proportional to the transmitted torques, and one of said systems having one of its races held against rotation and having its rolling bodies carried by the other said elements, and interlocking means independent of said first mentioned means intermediate the other races of the two systems for causing them to rotate together.

ALAIN MADLÉ.